United States Patent [19]
Marzocchi et al.

[11] 3,973,613
[45] Aug. 10, 1976

[54] TIRE REINFORCEMENT

[75] Inventors: Alfred Marzocchi; David E. Leary, both of Cumberland, R.I.

[73] Assignee: Owens-Corning Fiberglas Corporation, Toledo, Ohio

[22] Filed: Dec. 12, 1974

[21] Appl. No.: 532,422

[52] U.S. Cl. ................... 152/361 FP; 152/361 DM
[51] Int. Cl.[2] ............................................. B60C 9/18
[58] Field of Search ............. 152/361 FP, 354, 357, 152/361 DM

[56] References Cited
UNITED STATES PATENTS

| | | |
|---|---|---|
| 3,570,573 | 3/1971 | Marker et al. .................. 152/361 R |
| 3,570,574 | 3/1971 | Marker et al. .................. 152/361 R |

FOREIGN PATENTS OR APPLICATIONS

| | | | |
|---|---|---|---|
| 1,582,431 | 4/1969 | France ......................... | 152/361 FP |
| 1,480,907 | 3/1969 | Germany ....................... | 152/361 FP |
| 1,217,475 | 12/1970 | United Kingdom ........... | 152/361 FP |

*Primary Examiner*—Drayton E. Hoffman
*Attorney, Agent, or Firm*—John W. Overman; Charles R. Schaub

[57] ABSTRACT

An improved tire reinforcement construction is disclosed. The construction includes a folded one-piece reinforced tread ply or belt, resulting in a two-ply belt structure. Elastomeric spacer members may be included in the vicinity of the folds to increase the radius of curvature at the folds. This construction simplifies belted tire assembly and results in improved tire wear characteristics. Glass fiber reinforced material is particularly suited for the folded belt.

2 Claims, 7 Drawing Figures

TIRE REINFORCEMENT

BACKGROUND OF THE INVENTION

The invention relates to belted tire construction and more particularly to a construction including a folded belt containing glass or other reinforcement fibers.

The use of glass fibers in various forms as carcass and tread reinforcement for pneumatic tires is well known and has a number of unique advantages not afforded by other materials. See, for example, U.S. Pat. Nos. 2,184,326, 2,884,040, 2,894,555, 3,315,722 and 3,523,472. In tires incorporating tread reinforcing belts, various belt folding constructions have been suggested, particularly in the case of steel wire reinforced belts. See U.S. Pat. Nos. 3,404,721 and 3,623,529.

Tire belt folding configurations such as those disclosed in the above '721 and '529 patents are designed to overcome a tire wear problem known as belt edge or breaker edge separation. Generally, tread reinforcing belts, or tread plies, are positioned within the crown of a tire between carcass and tread as generally flat, annular bands which extend circumjacent the carcass. There may be one, two or more of these annular bands positioned generally parallel and concentrically adjacent one another. The belts almost universally contain parallel cords of organic, steel or glass materials oriented on a bias angle from the circumferential center line of the tire, with adjacent belts generally being oriented at opposed bias angles.

The problem of belt edge separation generally arises from road stresses acting in the shoulder areas of the tire where the edges of the belts lie. These extreme shoulder area stresses are caused primarily by the rotation of the load-bearing tire into its contact patch with the pavement. The continual changing in shape of the tire's cross section causes the stresses, concentrating them in the shoulder areas. The belt edges within the shoulder areas generally contain exposed ends of the bias oriented cords. Thus, the interface between the cord and the surrounding rubber or elastomeric material is often the weakest bond area between the belts and the tire crown within which they are encapsulated. The shoulder area stresses therefore tend to cause a separation of the cord end from the adjacent rubber, thereby resulting in a gradual ply separation which can be aggravated by high speed conditions.

Belts having folds, rather than raw edges, in the shoulder area of the tire have been proposed as a solution to the above problems. The folds not only remove the exposed-cord edges of the belt from the high-stress shoulder areas, but also act to somewhat stiffen the tire shoulders so that less movement is encountered in these shoulders and stress on the belts in this area is effectively reduced. Thus, the effect of the folded belts is to stiffen the lateral edges of the tread and to some degree interlock them so that the crown reinforcement as a whole acts more uniformly in avoiding shifting of the reinforcement cords, particularly the ends of the cords.

However, the use of such folded belts has met with some problems. Regardless of the type of fiber used in the cords of the plies, a sharply folded belt ordinarily does not impart the needed stiffness to the tire shoulder and the wear characteristics of the tire are thus not what they could be. Moreover, when metal or glass fiber belt cords are used, it has been suggested that the cords tend to break along the sharp fold lines due to bending stresses encountered when the belt edges are folded in the manufacturing process and repeated during tire usage. The above-mentioned U.S. Pat. No. 3,404,721 proposes a solution to this latter problem in the case of metal belt reinforcement by using multiple belts in which the fold of one encompasses the outer edge of another, and the folded belt employs metal cords having a lower modulus of elasticity than those of the flat belt. This, of course, requires relatively complex construction in a belted tire.

SUMMARY OF THE INVENTION

The present invention provides folded belt construction which alleviates the problem of belt edge separation and overcomes the above-discussed problems previously encountered with folded belts. In addition, the tire construction of this invention, whether it be incorporated in a radial ply or a biased ply carcass tire, results in a tire of unusual roadability and integrity at high speeds.

A belted tire according to this invention includes a one-piece tread ply or belt folded into a horizontal "S" configuration, forming a two-ply belt structure, with the arms or legs of the "S" terminating short of the width of the belt. The belt reinforcement cords preferably comprise glass fibers but may alternatively be formed from metal wire, organic material or other conventional cord material. Spacer members of elastomeric material or glass-reinforced elastomeric material may be included within the folds of the belt in order to increase the radius of curvature at each fold. The larger radius increases the bulk of each fold, resulting in a stiffening effect in the tire shoulders, or lateral tread edges. The stiffened tire shoulders are thus made more capable of resisting a variety of forces acting upon the ends of the belt under dynamic conditions. The stiffened shoulders also act to stiffen the tread cross section thereby reducing rolling resistance. In addition, the enlarged radius of curvature maintained by the fold spacer members prevents creasing and helps assure that belt cord breakage will not occur at the folds in the case of metal or glass reinforcement.

The particular folded belt configuration of this invention has been found superior in tire performance as well in simplicity and economy of tire construction. In actual road testing, tires incorporating the belt design of the invention were able to withstand without failure high speeds of five to ten m.p.h. faster than tires employing other folded belt designs. The reason for this superiority is believed to stem from the fact that the present belt design eliminates the presence of any sharp break line defined by the ends of the belt cross section. Rather, the top and bottom belt ends, at their most adjacent position near the center of the belt, are separated by a belt thickness. This serves to maintain the structural integrity between the left and right halves of the belt, while dividing the center stress line and eliminating a sharp break point as would be present, for example, with a split "O" configuration or a multiple piece folded belt configuration.

The present invention also contemplates the use of spacer members for maintaining enlarged radii in the folds of other folded belt configurations. Such spacers act to stiffen tire shoulder areas and eliminate cord breakage problems in all folded belt designs, including those in the prior art, in the same manner as in the "S" tire belt design of the present invention.

DESCRIPTION OF THE PREFERRED EMBODIMENTS

Figures 1, 2:
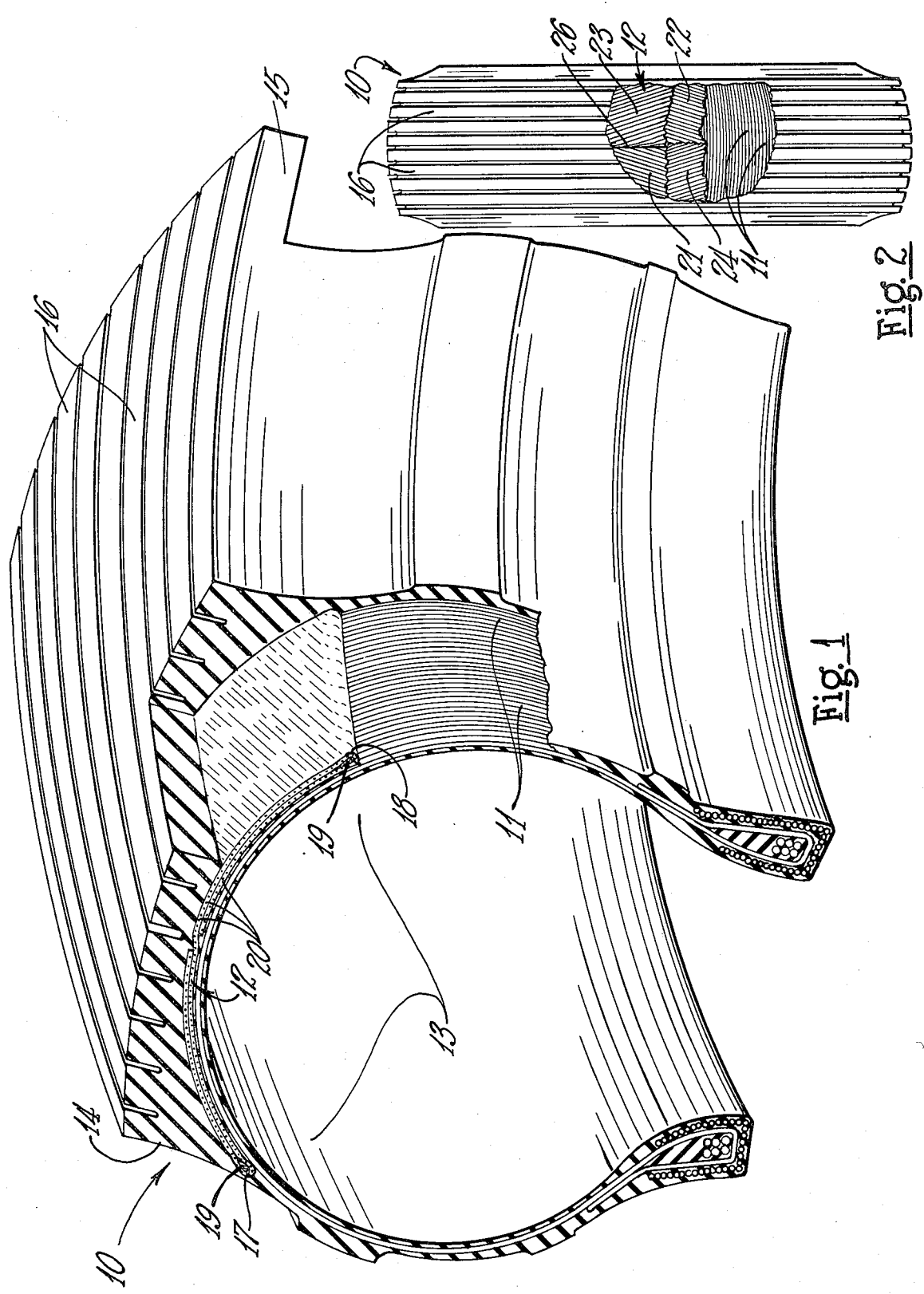
FIG. 1 is a perspective view of a section of a pneumatic tire having a radial carcass ply and including a folded belt construction according to the present invention.
FIG. 2 is a partially broken away plan view of the tire indicating ply cord patterns.

In the drawings, FIG. 1 shows a section of a tire 10 having radial carcass ply reinforcement 11 and including a double thickness folded tread ply or belt 12 extending through a crown 13 of the tire from shoulder 14 to shoulder 15 beneath a tread 16. The belt 12 is folded from a sheet of bound-together parallel cords 20 cut on a bias angle. Although any suitable material may be used for the cords 20, they are preferably formed from metal wire or glass fibers, the latter being preferred because of their stiffness-imparting characteristics. Within each of a pair of folds 17 and 18 of the belt 12 is a spacer member 19 for maintaining an enlarged predetermined radius of curvature at the fold, thereby preventing creasing. The spacer 19 may be of an elastomeric material which may be reinforced with glass fibers or other suitable material.

The plan view of FIG. 2 indicates the orientation of the radial carcass ply 11 and of the various layers of parallel cords in the tread plies or belt 12. As a result of the "S" shaped folding configuration of the belt 12, the cord orientation in the upper or outer left portion 21, as viewed in FIGS. 1 and 2, of the belt is parallel to that of the lower or inner right portion 22, while the upper right portion 23 has cords parallel to those of the lower left portion 24. The cord angles of nonparallel cords are of course opposite one another because of the manner in which the belt 12 is folded. In the upper belt section comprising the left half 21 and the right half 23, therefore, the parallel bias ply cords of each side 21 and 23 converge toward the circumferential center line 26 of the tire. This symmetrically bifurcated outer ply cord angle has a particular significance. Road stress is always accepted by a given ply cord at its leading edge as that portion of the tire makes contact with the road, and the stress is progressively transferred along the length of the cord to its trailing edge. It is theorized that the two-angle outer ply tire 10 of the present invention is oriented on an automobile such that the apex of the "V" defined by the converging cords strikes the road first in the case of each pair of converging cords, a reduction in rolling resistance as compared with normal belted tires will be encountered. This effect will be due to the fact that the leading edge of each cord on each outer ply side 21 and 23 would fall along the longitudinal center line 26 of the tire 10. Thus, stress would be symmetrically dispersed outward from the center of the tire to its shoulders, thereby appreciably reducing rolling resistance.

Figure 3:
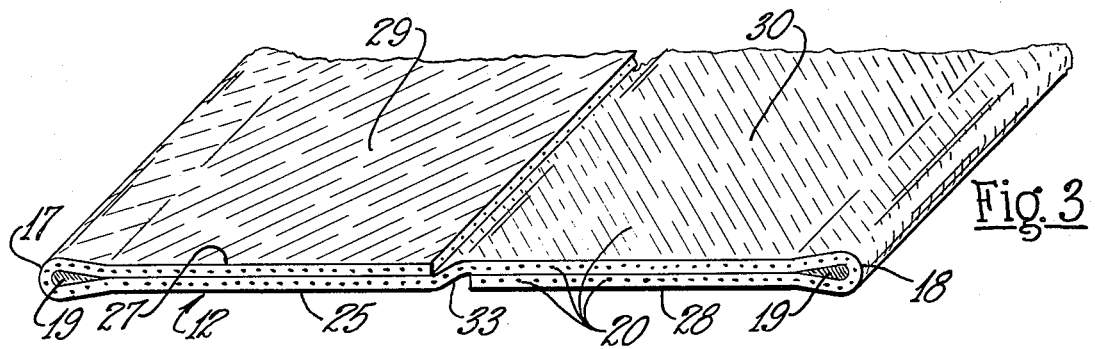
FIG. 3 is a schematic perspective view of the folded belt of FIG. 1, shown apart from the tire in which it is incorporated.

FIG. 3 shows the reinforcing belt 12 apart from the tire 10. The belt 12 includes a base portion 25 extending from fold to fold and upper and lower folded leaves 27 and 28. The leaves 27 and 28 need not extend substantially to the belt center as shown in FIGS. 1, 2 and 3. However, this design is preferable since it generates a fully two-ply belt and provides for maximum strength and stiffness in the folded "S" belt.

The spacer members 19, which may be included for additional shoulder stiffening, are preferably round or teardrop-shaped in cross section. The teardrop shape shown in FIG. 3, oriented with its rounded edge into the fold, provides a transitional area between the bulky outer fold areas 17 and 18 and the flatter inner areas 29 and 30, respectively. The inclusion of the spacers 19 is primarily to add bulk to the fold areas 17 and 18, and also to help prevent breakage of reinforcement cords in the case of metal or glass cord. Without the spacers 19, the "S" folded belt would nonetheless provide for increased tire shoulder stiffness over non-folded belt tires. The folded belt 12 without spacers 19 would also be superior over other folded and non-folded belts for the additional reasons discussed above.

A central area 33 of the belt base portion 25 passes through an oblique angle in its transition between the left half and the right half of the base portion 25 as viewed in FIG. 3. It should be stated that since FIG. 3 shows an exaggerated belt thickness, the oblique middle portion 33 would actually define a more gentle angle, as more closely approximated in FIG. 1.

Figure 4:
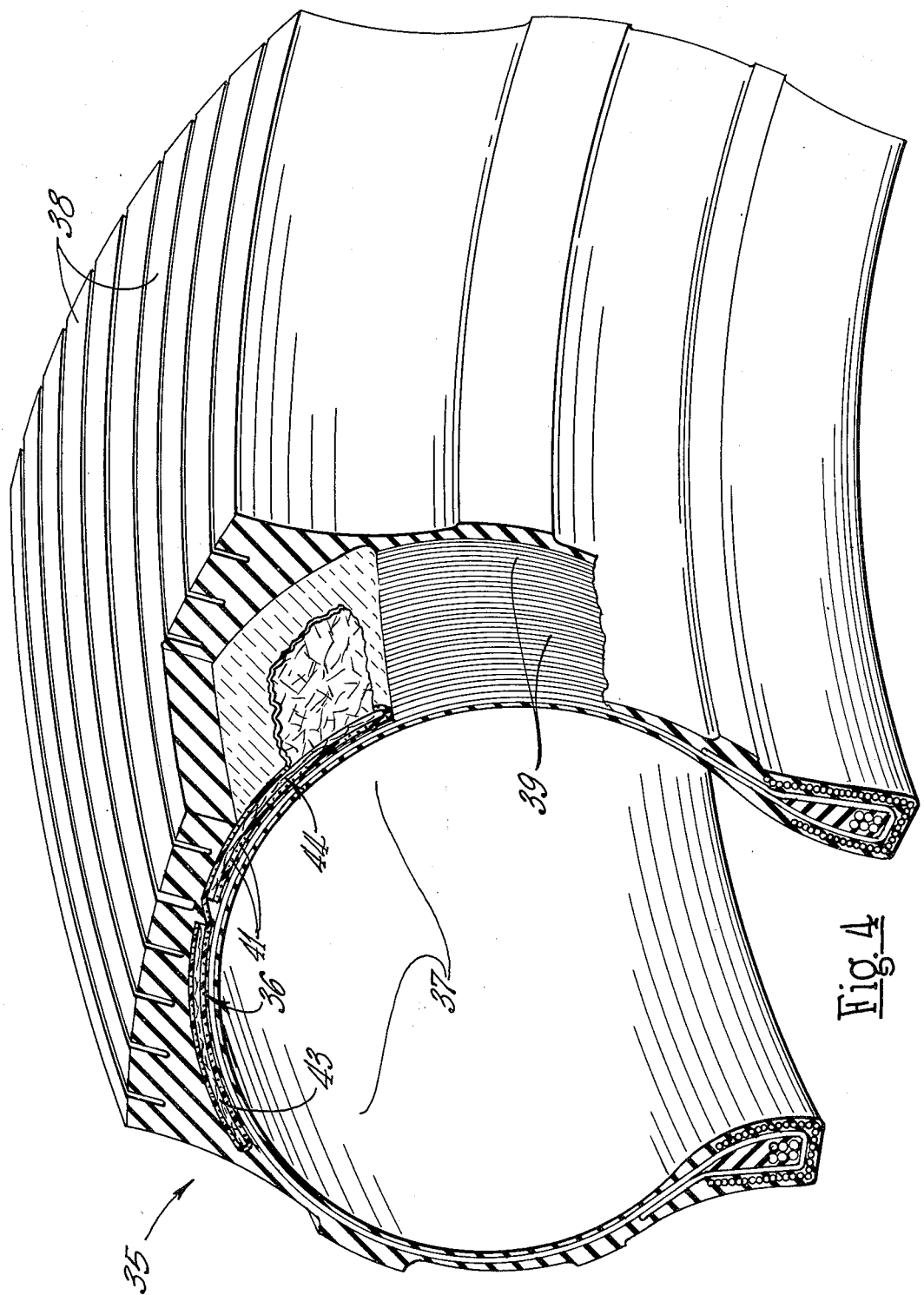
FIG. 4 is a perspective view of a tire section employing a belt design similar to that of FIG. 1, but with a different type of fold spacer.

FIG. 4 shows another embodiment of the invention. A "S" folded belt 36 is shown incorporated into the crown 37 beneath the tread 38 of a tire 35. The tire 35 is shown with radial ply carcass reinforcement 39, although bias ply carcass reinforcement may alternatively be used. The belt cords 41 shown in the belt 36 may comprise any suitable material, but are preferably of either metal wire or glass. Within the folds of the belt 36 are a pair of sheet-like spacing and stiffening members 43 and 44. The layers 43 and 44 are preferably formed of an elastomer compatible with the remainder of the tire and containing a quantity of glass. The glass is preferably in two proportions, one ranging from about five to ten per cent of the whole in the form of discrete individual glass filaments ranging from about one-fourth inch to one inch in length. The other proportion ranging up to about 30 per cent is composed of chopped glass cords one-fourth inch to three-fourths inch in length. Each chopped cord comprises a plurality of twisted-together strands, each strand in turn being composed of a plurality of yarns which in turn comprise about 200–400 discrete glass filaments. The cords are first formed in a continuous length and then chopped to about one-fourth inch length. The chopped cords and filaments are calendered together with the elastomer stock to form the reinforcement layers 43 and 44 wherein substantially each glass cord and filament is surrounded by elastomer stock without appreciable contact with other filaments or cords. FIG. 4 schematically indicates the glass filaments and cords encapsulated within the elastomer stock.

Figure 5:
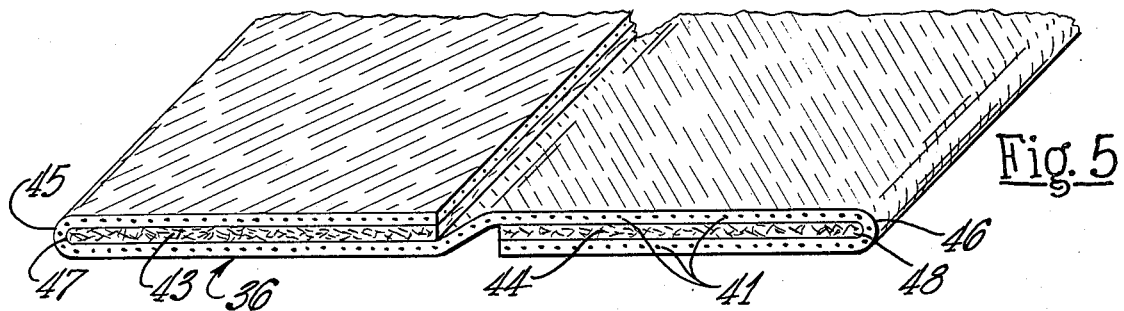
FIG. 5 is a schematic perspective view of the belt of FIG. 4, shown apart from the tire.

FIG. 5 schematically indicates the belt 36 apart from the tire 35. The reinforcement layers 43 and 44 both provide an enlarged radius of curvature at the folds 45 and 46, the outward ends 47 and 48 of the reinforcement layers being suitably rounded within the folds. The layers 43 and 44 also act to stiffen the belt 36, providing for better wear characteristics and further reducing tire rolling resistance by stiffening of the tread.

Figure 6:
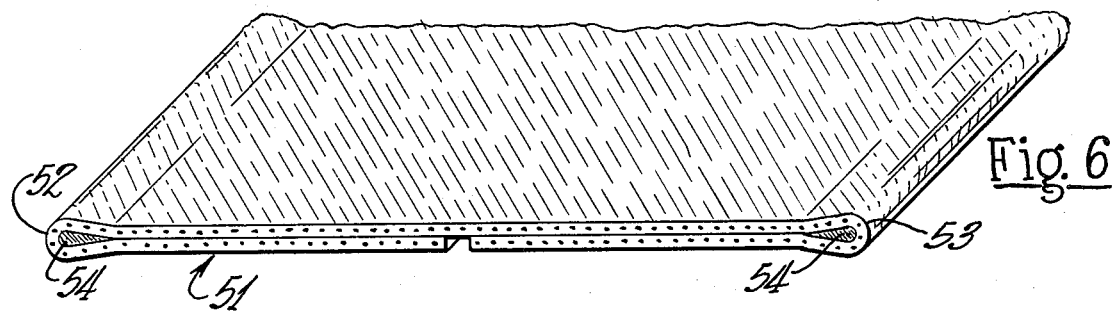
FIG. 6 is a schematic perspective view of another type of folded belt including fold spacer members according to the invention.
Figure 7:
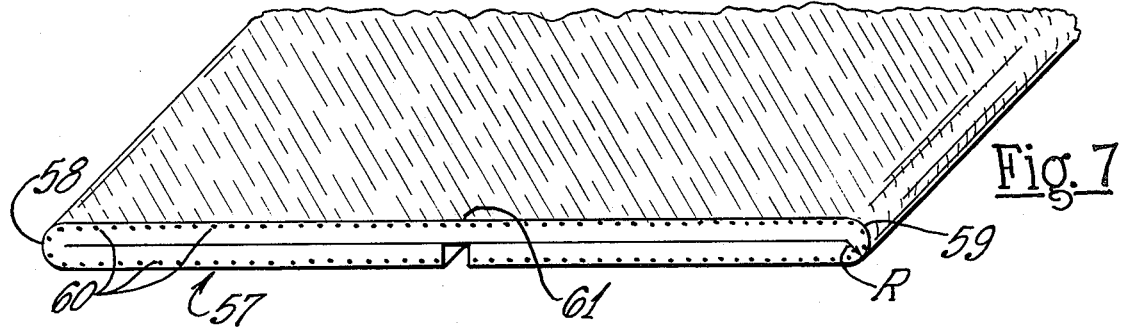
FIG. 7 is a schematic perspective view showing an alternative structure for maintaining a radius of cord curvature in a folded belt similar to that of FIG. 6.

FIGS. 6 and 7 show another form of folded tire belt and fold spacing means according to the invention. The fold configuration shown reduces belt edge separation while providing for a simplified belt assembly in the tire building process. The belt 51 of FIG. 6 has folds 52 and 53 enlarged and stiffened by spacers 54 which may be round or teardrop-shaped. The spacing and stiffening members 54 increase tire wear characteristics in this fold configuration and others in the same manner as discussed above for the "S" folded belt.

Instead of the spacers 54, the folded belt 51 of FIG. 6 and other typical folded belts may employ reinforcement layers such as the layers 43 and 44 of FIG. 5 to maintain a radius of curvature at the folds 52 and 53 and to stiffen the belt 51. In the case of the fold configuration shown in FIG. 6, the reinforcement layer could comprise one continuous member extending from fold 52 to fold 53.

FIG. 7 shows a folded tire reinforcing belt 57 similar to that of FIG. 6 but employing a different means for establishing a larger radius of curvature R in the fold. Rather than employing a spacing member within the folds 58 and 59, the belt 57 is instead formed with its parallel cords 60 offset from the center of the surrounding elastomeric stock 61. Prior to folding, the belt is calendered with the cords 60 closer to one surface of the elastomeric stock 61. The calendered belt 57 may be somewhat thicker than, for example, the belt 51 of FIG. 6 to provide for the desired radius of curvature R of the cords 60 around the folds 58 and 59. The calendered belt 57 is of course folded with its cords 60 disposed outwardly as indicated in FIG. 7.

The above-described preferred embodiments provide numerous advantages over prior belted tire structure in both radial ply and bias ply carcass tires. As a result of the "S" folded belt configuration, the tread of a tire is afforded increased stiffness and the entire crown is strengthened, providing resistance to belt edge separation and allowing the tire to undergo more extreme road conditions without failure. In addition, this fold configuration can appreciably reduce tire rolling resistance without compromising ride characteristics. When belt fold reinforcement according to the invention is incorporated in the "S" folded belt or in other folded belt designs, a further increase in crown strength and tread stiffness results, and this reinforcement, particularly adaptable to glass-reinforced belts, also helps resist cord breakage at the folds. Alternatively, the offset cord belt structure of the invention affords a simpler tire assembly while increasing tread stiffness and providing resistance to cord breakage in many folded belt tire designs. Various other embodiments and alterations to this preferred embodiment will be apparent to those skilled in the art and may be made without departing from the spirit and scope of the following claims.

We claim:

1. In a pneumatic tire construction including a carcass, a tread connected to the carcass defining a pair of shoulders where the edges of the tread meet the carcass and a crown area extending from shoulder to shoulder, the improvement comprising at least one folded reinforcing belt within the crown peripherally circling the carcass beneath the tread, said belt containing a plurality of mutually parallel cords, said cords of said belt being positioned more closely adjacent to the outer surface of said belt at each fold than to the inner surface, the distance between said cords and said inner surface being sufficiently large to establish a predetermined radius of curvature of said cords at each fold in the belt.

2. The tire construction of claim 1 wherein said cords of said belt are comprised of glass fibers.

* * * * *